United States Patent [19]
Rifi

[11] 3,867,323
[45] Feb. 18, 1975

[54] WATER-DILUTABLE COATING COMPOSITIONS CONTAINING MALEINIZED OIL AND RESOLE

[75] Inventor: Mahmoud R. Rifi, Kendal Park, N.J.

[73] Assignee: Union Carbide Corporation, New York, N.Y.

[22] Filed: June 6, 1973

[21] Appl. No.: 367,436

[52] U.S. Cl.......... 260/19 R, 117/161 L, 260/29.3, 260/32.6 R
[51] Int. Cl............................................ C08g 45/08
[58] Field of Search .................... 260/19 R

[56] References Cited
UNITED STATES PATENTS

| | | | |
|---|---|---|---|
| 2,586,385 | 2/1952 | Runk................. | 260/19 R |
| 2,878,199 | 3/1959 | Mohr et al........ | 260/19 N |
| 3,251,791 | 5/1966 | Goodchild......... | 260/19 R |
| 3,300,424 | 1/1967 | Hoenel et al..... | 260/2 |
| 3,481,892 | 12/1969 | Huang et al...... | 260/22 R |
| 3,567,668 | 3/1971 | Guldenpfennig.. | 260/19 R |
| 3,650,996 | 3/1972 | Guldenpfennig.. | 260/20 |
| 3,671,474 | 6/1972 | Van Westrenen.. | 260/20 |

FOREIGN PATENTS OR APPLICATIONS

| | | | |
|---|---|---|---|
| 809,703 | 4/1969 | Canada............ | 260/19 R |

*Primary Examiner*—Ronald W. Griffin
*Attorney, Agent, or Firm*—Charles J. Metz

[57] ABSTRACT

Water-dilutable coating compositions are produced by reacting a maleinized oil containing maleic anhydride groups with a resole to effect reaction between the maleic anhydride groups and the methylol groups of the resole. The reaction product of the maleinized oil and resole is then neutralized with a base to form a water-dilutable coating composition.

18 Claims, No Drawings

WATER-DILUTABLE COATING COMPOSITIONS CONTAINING MALEINIZED OIL AND RESOLE

This invention relates to a process for producing water-dilutable coating compositions, and to the compositions so produced. More particularly, the invention relates to a process wherein a maleinized oil containing maleic anhydride groups is reacted with a resole to effect reaction between the methylol groups of the resole and the maleic anhydride groups. The reaction product is then neutralized with a base to form a water-dilutable coating composition.

The prior art has taught the use of phenolic resins in water-dilutable coating compositions. For instance, in the patent to Van Westrenen, U.S. Pat. No. 3,671,474, there is disclosed a water-dilutable coating composition that is produced by the following sequence of steps: first, an epoxide is reacted with a drying oil acid to produce an ester. This ester is then reacted with maleic acid or anhydride to add the said acid or anhydride to the ester. There is thereby produced what can be termed broadly a maleinized oil. The maleinized oil is then reacted with a novolak resin that is free of methylol groups. In U.S. Pat. No. 3,567,668, the patentee, Rolf Guldenpfennig, teaches a water-dilutable coating composition prepared by reacting a particular maleinized oil with a resole. The maleinized oil is first hydrolyzed in order to transform all of the anhydride groups to free carboxyl groups prior to the reaction with the resole. Because the maleinized oil is hydrolyzed to destroy all of the anhydride groups, prior to the reaction with the resole, there can be no ester linkages formed between the resole and the maleinized oil. In U.S. Pat. No. 3,251,791, the patentee, Goodchild, teaches a water-dilutable varnish that comprises the reaction product of a maleinized oil and a resole. Preferably, a polyhydric aliphatic alcohol such as pentaerythritol is in the reaction mixture when the maleinized oil and resole are reacted. In that case, and when Goodchild's maleinized oil contains anhydride groups (which are not required to be present, and are not even preferred), the anhydride groups will virtually exclusively react with the polyol rather than the methylol groups of the resole. In the only clear teaching in Goodchild of a reaction mixture containing only maleinized oil and resole as the reactants, water is present in the reaction mixture (column 2, lines 60 et seq.). The water would hydrolyze any anhydride groups that might have been present, thereby preventing an esterification reaction between the maleic acid moieties and the methylol groups of the resole. It is not clear what type of reaction that Goodchild contemplated between the maleinized oil and the resole. It is clear, however, that he did not contemplate and does not teach an esterification reaction between anhydride groups of a maleinized oil and the methylol groups of a resole.

In addition to the prior art relating to water-dilutable coating compositions, the prior art is also aware of many references which describe the reaction between resoles and maleinized oil in varnishes which are not water-dilutable. Such references include U.S. Pat. Nos. 2,586,385 and 3,300,424. However, in none of these references is there any teaching of the possibility or desirability of effecting a reaction between the methylol groups of the resole and the maleic anhydride groups of the maleinized oil. Therefore, although it is recognized that this invention falls within a crowded art, it is believed that applicant has discovered a major and significant contribution to this art.

The present invention provides an improvement in the art of water-dilutable coating compositions containing phenolic resins. The process of the invention comprises the steps of (a) reacting a maleinized oil containing maleic anhydride moieties, with a resole, at a temperature and for a period of time sufficient to effect reaction between the methylol groups of the resole and the anhydride groups of the maleinized oil to form ester links between said resole and said oil, and also to form free carboxyl groups resulting from the reaction of said methylol group with the anhydride group, and (b) reacting the product of step (a) with a base to form a water-dilutable coating composition.

The first reactant that is employed in the invention is a maleinized oil. Maleinized oils constitute a known class of compositions, and their nature and production are well known to the art. As contemplated by this invention, the maleinized oils comprise the reaction products of maleic anhydride with a drying or semi-drying oil. The oil can be a natural product such as linseed oil, tung oil, soybean oil, fish oil, cottonseed oil, oiticica oil, perilla oil, sunflower seed oil, dehydrated castor oil, tall oil, safflower oil, or other naturally occurring oil which comprises the ester of an alcohol, usually glycerine, and an ethyleneically unsaturated fatty acid. Alternatively, the oil that is employed in the invention can be the reaction product of an ethylenically unsaturated fatty acid, or preferably a mixture of such fatty acids derived from a naturally occurring drying or semi-drying oil, with a precursor compound such as a polyol, a polyepoxide, or an epoxyalcohol. The nature and preparation of such compounds are known in the art. When reacting the ethylenically unsaturated fatty acid with a precursor compound, it is highly preferred to employ at least one equivalent of ethylenically unsaturated fatty acid per hydroxyl equivalent of the precursor compound. By the term "hydroxyl equivalent," is meant the equivalents of hydroxyl groups in the precursor compounds plus twice the number of equivalents of epoxy groups, since the initial reaction between the ethylenically unsaturated fatty acid and the epoxide group generates a hydroxyl group, which also must be esterified. The reason for this is that any hydroxyl groups present in the oil will destroy the anhydride groups of the maleic anhydride when oil is reacted with the anhydride. Although a small amount of hydroxyl groups can be tolerated, and in fact it will almost always be the case that there will be a very small percentage of such hydroxyl groups present, the presence of significant amounts of hydroxyl groups will destroy significant amounts of the anhydride groups in the maleic anhydride, and thereby lessen the proportion of anhydride groups that are subsequently available for reacting with the methylol groups of the resole.

When the oil employed in the invention is the reaction product of an ethylenically unsaturated fatty acid and a precursor compound, it is preferred that the precursor compounds containing sterically hindered hydroxyl groups in order that the cured coating composition that is produced by the invention be less prone to hydrolysis. Sterically hindered hydroxyl groups are generated by epoxide groups, and also, secondary alcoholic hydroxyl groups and tertiary alcoholic hydroxyl groups are sterically hindered. Another useful sterically hindered group is a neopentyl hydroxyl group, that is, a methylol having a tri-substituted alpha carbon atom. The nature and production of such precursor compounds are well known to the art. Among the precursor compounds that can be employed for reaction with an ethylenically unsaturated fatty acid are epoxides, such as the diglycidyl diether of bisphenol-A and higher condensation products of this series, other polyglycidyl polyethers of polyhydric phenols, aliphatic polyepoxides such as 3,4-epoxycyclohexylmethyl 3,4-epoxycyclohexanecarboxylate, vinyl cyclohexene dioxide, and bis(2,3-epoxycyclopentyl)ether, and epoxy alcohols such as the compound of the formula:

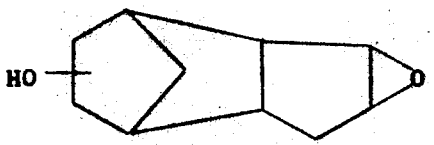

Other precursor compounds that can be employed to react with an ethylenically unsaturated fatty acid are alcohols, preferably polyhydric alcohols, such as ethylene glycol, glycerol, 1,2,6-hexanetriol, pentaerythritol, 2,2,4,4-tetramethyl-1,3-cyclobutanediol, 2-hydroxy-1,1-dimethylethyl 4-hydroxy-3,3-dimethylbutanoate, and other polyhydric alcohols.

The ethylenically unsaturated fatty acids that are employed for producing the oil are generally $C_8$ to $C_{20}$ fatty acids containing one or more ethylenically unsaturated groups. A small percentage of saturated fatty acids may also be employed. The ethylenically unsaturated fatty acids that may be employed, either singly or preferably in mixtures thereof, include, but are not limited to, oleic acid, linoleic acid, linolenic acid, ricinoleic acid, licanic acid, eleostearic acid, palmitoleic acid, erucic acid, elaidic acid, and brassidic acid.

If desired, the drying oil acid can be employed in the reaction with maleic anhydride simply in the form of the ethylenically unsaturated fatty acid. Therefore, the reactant that is reacted with maleic anhydride can be either an ethylenically unsaturated fatty acid, an ester of such acid with a precursor compound such as a polyol, an epoxide resin, or an epoxy-alcohol, or a naturally occurring drying or semi-drying oil. For simplicity, this reactant will be subsequently referred to as an "oil," although it is understood that this oil includes either the ethylenically unsaturated fatty acid or an ester thereof, including a naturally occurring oil.

The next step in the sequence of reactions that is employed to produce the coating compositions of the invention is to react the oil with maleic anhydride to form an adduct. While maleic anhydride is highly preferred for economic reasons, any alpha, beta-unsaturated anhydride could be used in place of the maleic anhydride. The maleic anhydride (or other alpha,beta-unsaturated anhydride) is employed in the invention for several reasons. First, it is employed to provide a reaction site to insure chemical bonding between the oil and the resole. Further, it is employed to provide free carboxylic acid groups which can be neutralized with a base to provide water-dilutability of the coating composition. Other factors to be considered in selecting the specific proportion of the maleic anhydride are the proportion of resole that is to be employed, the presence or absence of other free carboxylic acid groups in the oil, and the like. It is not necessary to insure reaction of all resole molecules with maleic anhydride, although as a general rule, the more chemical bonding there is, the better the properties of the coating composition and the cured coatings made therefrom. It has been found generally that the foregoing objects are accomplished if the maleic anhydride is employed in amounts of from about 1 to about 20 weight percent, based on weight of oil.

The reaction of maleic anhydride with oil is a known reaction. It is carried out at a temperature and for a period of time sufficient to effect an addition reaction between the oil and the ethylenic double bond contained in the maleic anhydride. In general, the reaction between the maleic anhydride and the oil is carried out at a temperature within the range of from about 150° to about 250°C. for a period of about 1 to about 3 hours. This reaction should be carried out under an inert atmosphere, such as nitrogen.

During and after the addition of maleic anhydride to the reaction mixture, the reaction mixture should be kept as dry as practicable in order to preserve the anhydride moieties.

The next reactant that is employed in the invention is a resole. As is well known in the art, resoles are condensation products of phenols with an aldehyde, preferably formaldehyde. The condensation reaction is carried out in the presence of a basic catalyst. The significant property of the resole for the purposes of this invention is the presence of methylol groups in the resole. Among the phenols that can be employed to produce the resole, either singly or in mixtures thereof, there can be mentioned phenol, and preferably para-substituted phenols such as para-tertiary-butylphenol, para-phenylphenol, para-chlorophenol, para-alkoxyphenol, and the like. Generally, the para substituent will have up to about 10 carbon atoms, and will be selected to impart oil-solubility to the resole.

The resole is reacted with the maleinized oil for a period of time and at a temperature sufficient to effect reaction between the methylol groups of the resole and the anhydride groups. As a result, chemical bonding in the form of ester groups are formed between the resole and the maleinized oil. The reaction occurs principally between the methylol groups of the resole and the anhydride groups. Upon the reaction of a methylol group with an anhydride group, in addition to the formation of an ester linkage between the resole and the maleinized oil, a free carboxylic acid group is generated. No significant reaction will occur between the free carboxylic acid groups present in the reaction mixture and the methylol groups of the resole, because this esterification reaction would require a catalyst or much higher temperatures to proceed to any appreciable extent. Also, no significant reaction occurs between the phenolic hydroxyl groups of the resole and either the anhydride groups or the free carboxyl groups. The reason for this is that phenolic hydroxyls do not react to any appreciable extent with free carboxylic acid groups under any conditions, and they react with carboxylic anhydride groups only under appropriate reaction conditions such as in an aqueous alkaline solution. Generally, the reaction between the maleinized oil and the resole is carried out at a temperature within the range of from about 80° to about 150°C., and preferably from about 100° to about 130°C., for a period of from about 2 to about 10 hours. It will be appreciated by those in the art that the reaction temperature should be below the point where significant heat-induced condensation of the resole occurs. This reaction should also be carried out under an inert atmosphere such as nitrogen.

There are several advantages that are obtained by the use of a resole in the invention. First, the reaction of the resole phenolic resin with the maleinized oil can be carried out at a lower temperature than is the case when novolaks are reacted with maleinized oil. Second, the resole provides a built-in crosslinking agent through phenolic, one-step type crosslinking, that can contribute to cure of the coating composition when it is baked. For this reason, a lower molecular weight varnish can be employed, which is easier to handle than a higher molecular weight material. Also, cure of the coating is not fully dependent upon drying of the oil. Therefore, a lower degree of ethylenic unsaturation in the oil can be tolerated. Cure temperature can be lower than is the case when a novolak is employed as the phenolic resin in a water-dilutable coating composition.

The proportion of resole that is employed is dependent, in part upon several factors. First, the resole is used because it imparts better corrosion resistance and caustic resistance to the coating composition. When the coating composition is employed in electrocoating, the presence of the phenolic resin improves throwing power, and permits a higher operating voltage to be used because the breakdown voltage of the varnish will be higher. Too much phenolic resin may cause poor impact resistance and may cause excessively high viscosity in the varnish. Therefore, with these considerations in mind, it has been found that a proportion of from about 10 to about 50 weight percent of resole, based on maleinized oil, will generally accomplish the objectives of the invention.

After the reaction between the resole and the maleinized oil has been completed, it is preferred to add a small amount of water to the reaction mixture in order to hydrolyze any unreacted anhydride moiety that might be present. The reaction for doing this is that the preferred way of forming a water-dilutable varnish composition from this reaction product is to neutralize it with an amine. If there are anhydride groups present, however, the amine will react with them to form amides which are difficulty soluble in water, instead of the more readily soluble salts that result from the reaction of the amine with a free carboxyl group.

The next step in producing the water-dilutable coating compositions of the invention is to neutralize the maleinized oil-resole reaction product with a base. It is not necessary to neutralize all of the carboxylic acid groups that are present in the reaction product. The base is employed in an amount sufficient to impart water-dilutability to the composition. Among the bases that can be employed are amines such as ammonia, lower alkylamines such as triethylamine, alkanolamines such as monoethanolamine, diethanolamine, isopropanolamine, and alkali metal hydroxides such as sodium hydroxide and potassium hydroxide. The reaction of a carboxyl containing oil such as the present one with a base to form a water-dilutable varnish composition is known in the art. As a general rule, from about 50 percent to 100 percent of the free carboxylic acid groups present in the reaction product will be neutralized with the base.

In order to insure water-dilutability, there is generally employed a co-solvent in the varnish. Such co-solvents include alcohols such as ethyl alcohol, isopropyl alcohol, and n-butanol, glycols such as ethylene glycol, propylene glycol, and diethylene glycol, glycol ethers such as beta-ethoxyethanol, and the like, esters such as ethyl acetate, ketones such as methyl ethyl ketone, and other solvents which are water-miscible and which are also solvents for the maleinized oil-resole reaction product. Generally, not more than 20 weight percent of the non-volatile portion of the coating composition will be an organic cosolvent. This 20 percent limit is an arbitrary standard that has been set by the government for anti-pollution purposes.

The water-dilutable coating compositions can be utilized by procedures that are analogous to the known methods for using water-dilutable coating compositions containing phenolic resins and drying oil. The coating composition can be formulated by known techniques to be applied to a substrate by spraying, dipping, brushing, electrocoating, and the like. Known classes of pigments, driers, and other additives can be used.

The coatings can be applied to metal substrates, as well as other materials. The coating compositions of the invention can be cured by a bake at a temperature within the range of from about 120° to about 200°C., for a period of from about 10 to about 30 minutes. The bake is, of course, carried out in air or other oxidizing atmosphere, and cure is effected by the conventional drying reaction of the oil, and, in most cases, also by condensation of residual methylol groups of the resole.

The Examples set forth below illustrate certain aspects of the invention.

In the Examples, the following reactants were employed:
Epoxyalcohol A
a compound of the formula

Esterdiol A
2-hydroxy-1,1-dimethylethyl 4-hydroxy-3,3-dimethylbutanoate;
Resole A
a resole formed by reacting 1 mole of para-tertiarybutylphenol with 4 moles of formaldehyde in the presence of sodium hydroxide catalyst;
Resole B
a resole formed by reacting 1 mole of a 50/50 mixture of para-tertiarybutylphenol and paraamylphenol with 4 moles of formaldehyde in the presence of sodium hydroxide catalyst; and
Novolak A
a novolak comprising the acid-catalyzed condensation product of p-tertiarybutylphenol and formaldehyde.

EXAMPLE 1

A. Into a suitable reaction vessel, the following materials were charged:

| | |
|---|---|
| Epoxyalcohol A | 49.2 grams |
| Linseed oil acids | 260 grams |
| Xylene | 50 grams |
| Lithium naphthoate | 0.1 milligram (Li) |

The reaction mixture was stirred, under nitrogen, at 230°C. until an acid number of about 10 milligrams of potassium hydroxide per gram of reaction mixture had been reached. This took about 6–8 hours. The water formed by the esterification reaction was removed azeotropically as it was formed during the reaction. Left over xylene and water were removed by distillation.

Maleic anhydride (30 grams) was then added to the reaction mixture, and the mixture was stirred for 3 hours at 230°C. under a nitrogen atmosphere.

The reaction mixture was then cooled to 100°C., and 127 grams of Resole A was added. The reaction mixture was then stirred, under nitrogen, at 100°C. for 6 to 8 hours. After this reaction between the maleinized oil and the resole, 100 grams of water was added, and the reaction mixture was stirred, under nitrogen, for 1 hour at 100°C. Propanol (35 grams) was then added, and the reaction mixture was stirred for another hour at 80°–90°C., under nitrogen.

A mixture of 26 grams of monoethanolamine and 100 grams of water was added, and the mixture was stirred for 1 hour at 70°–80°C. After this neutralization, the composition is water-thinnable or dilutable.

The above material was mixed with red iron oxide (100 grams) by a high speed impellor. Water was added (about 5 liters) to yield a 10 percent solids coating composition, especially suitable for use as an electro-coating primer.

B. For comparison purposes, an electrocoating primer was made by a similar procedure, except that no phenolic resin was employed. The proportions of the reactants employed were as follows:

| | |
|---|---|
| Epoxyalcohol A | 70.1 grams |
| Linseed oil acids | 360.9 grams |
| Maleic anhydride | 35 grams |
| Monoethanolamine | 28.8 grams |
| Red Iron Oxide | 100 grams |

A comparison of typical properties of these two materials as electrocoating primers is shown in the table below. The coatings were applied to a phosphatized metal panel to a thickness of 0.75 mil, and they were baked at 185°C. for 20 minutes.

In rating the performance of the cured coatings in the salt spray test, creep is measured by scribing a line on the coating and measuring the extent or creep of corrosion from the line, the size of the blisters formed are reported as a number from 0 to 10 with the larger the number the smaller the blister, the amount of blisters formed is rated as F (few), M (medium), or D (dense), and the overall corrosion resistance of the coating is rated as a number from 0 to 10 with 0 signifying total failure and 10 no effect.

EXAMPLE 2

By a procedure analogous to that described in Example 1, a water-dilutable coating composition suitable for use in electrocoating was produced from the following materials:

| | |
|---|---|
| Linseed Oil | 300 grams |
| Maleic Anhydride | 60 grams |
| Heat at 230°C. under nitrogen for four hours. | |
| Resole A | 127 grams |
| Heat at 100°C. for 5–6 hours. Gardner viscosity 60% resin in xylene = S | |
| Water | 45 grams |
| Heat at 100°C. with stirring for one hour | |
| n-Hexyl 2-hydroxylethyl ether | 16 grams |
| Heat at 100°C. with stirring for ½ hour | |
| Monoethanolamine | 24 grams |
| Water | 150 grams |
| Stir at 70°C. for one hour | |
| Pigment | 155 grams |
| Barytes 145.7 grams | |
| Excelcior Black 7.75 grams | |
| Lead Silica Chromate 1.55 grams. | |

Use a high speed impellor, e.g., Cowles dissolver. Add about 5000 ml. water (total) in order to obtain 10 percent solid product.

| B. Properties | |
|---|---|
| Operating Voltage | 60 volts |
| Breakdown Voltage | 200 volts |
| Throwing Power (150v/2 min.) (Ford Pipe Test) | 4–⅝ inches |
| Bake Cycle | 190°C./30 min. |

Impact (inch-pound Gardner) pass F, 90; Pass R - 90.

| 5% Salt Spray — 500 hours | |
|---|---|
| Creep | None |
| Blister | None |
| Corrosion | 10 - T - 1 |

EXAMPLE 3

Using the same procedure and the same materials described in Example 2, except that Resole B was substituted for Resole A, a water-dilutable coating composition suitable for use in electrocoating was produced. Representative properties of this coating composition are as follows:

Thowing power-4 inches
Operating voltage—60

TABLE I

ELECTROCOAT PRIMERS

| Coating | Operating Voltage | Breakdown Voltage | Throwing[a] Power (Inches) | Gardner Impact Resistance, inch-pounds | | Tank[b] Stability | 5% Salt Spray 500 hours |
|---|---|---|---|---|---|---|---|
| | | | | F | R | | |
| 1(A) | 180 | 220 | 4.5 (200 v.) | 80 | 90 | >4 months | Creep: 5/32 inch Blister: 8F Corrosion: 9 |
| 1(B) | 120 | 200 | 3.75 (150 v.) | 60 | 40 | <30 days | Creep: 1 inch Blister: 4D Corrosion: 10 |

[a]Ford pipe test.
[b]Stirred with a magnetic bar at room temperature.

Breakdown voltage—210
Corrosion[a]—10
Gardner Impact—F-90 R-80
a. 5% Salt Spray, 500 hours.

EXAMPLE 4

By a procedure analogous to that described in Example 1, water-dilutable coating compositions were produced from the following components:

|  | A | | B | |
| --- | --- | --- | --- | --- |
|  | grams | moles | grams | moles |
| Linseed Oil Acid | 221.7 | 1.15 | 221.7 | 1.15 |
| Ester Diol A | 116.2 | 0.57 | 116.2 | 0.57 |
| Maleic Anhydride | 40 | 0.4 | 40 | 0.4 |
| Novolak A | 127 | — | — | — |
| Resole A | — | — | 127 | — |
| Monoethanolamine (in 150 ml. water) | 21.8 | 0.357 | 19.9 | 0.31 |
| n-Propanol | 50 | — | 50 | — |
| Red Iron Oxide | 100 | — | 100 | — |
| Water | 800 ml. | — | 800 ml. | — |

(In A, the novolak addition was made at 200°C. for 8–10 hours. In B, the resole addition was made at 100°C. for 10 hours).

The coating composition contained about 30 per cent solids. It was sprayed on phosphatized panels (to a thickness of 0.75 mil), baked at 190°C. for 30 minutes, and evaluated as follows:

| Ex. | Gardner Impact Inch-pounds | | 5% Salt Spray 500 hours | | |
| --- | --- | --- | --- | --- | --- |
|  | F | R | Creep | Blister | Corrosion |
| 4(A) | 90 | 70 | 5/16-in. | 6F | 9-T-2 |
| 4(B) | 110 | 100 | 5/16 | 8F | none |

What is claimed is:

1. Process which comprises the steps of (I) reacting, under substantially anhydrous conditions, (a) an adduct of (i) an alpha, beta-ethylenically unsaturated carboxylic acid anhydride, and (ii) a drying or semi-drying composition comprising at least one ethylenically unsaturated fatty acid or an ester thereof with a polyhydric alcohol, a compound having at least one vicinal epoxide group, or an epoxyalcohol, wherein said adduct contains carboxylic anhydride moieties, with (b) a resole containing methylol groups, for a period of time and at a temperature sufficient to effect reaction between at least some of said methylol groups and said anhydride moieties, to thereby form ester bonds between said adduct and said resole, and (II) neutralizing the product of step (I) with sufficient base to form a water-thinnable composition.

2. Process of claim 1 wherein said alpha, beta-ethylenically unsaturated carboxylic anhydride is maleic anhydride.

3. The process of claim 2 wherein step (I) of said process is carried out at a temperature within the range of from about 80° to about 150°C., for a period of from about 2 to about 10 hours.

4. The process of claim 2 wherein said drying or semi-drying composition is a naturally occurring drying or semi-drying oil.

5. The process of claim 2 wherein said drying or semi-drying composition is a mixture of ethylenically unsaturated fatty acids derived from a naturally occurring oil.

6. The process of claim 2 wherein said drying or semi-drying composition is an ester of (a) a mixture of ethylenically unsaturated fatty acids derived from a naturally occurring oil, and (b) a polyhydric alcohol, a compound having at least one vicinal epoxide group, or an epoxyalcohol, said ester being substantially free of alcoholic hydroxyl groups.

7. The process of claim 2 wherein said resole comprises the base-catalyzed condensation product of a para-substituted phenol and formaldehyde.

8. The process of claim 2 wherein said adduct is maleinized linseed oil.

9. The process of claim 2 wherein the product of step (I) is first reacted with water to hydrolyze any remaining anhydride moieties, and then neutralized with sufficient amine to form a water-dilutable composition.

10. The process of claim 2 wherein said resole is employed in an amount of from about 10 to about 50 weight percent, based on weight of said adduct.

11. A composition thinnable with water after neutralization, and which contains free carboxyl groups, which composition is the reaction product of:
a. an adduct of (i) an alpha, beta-ethylenically unsaturated carboxylic acid anhydride, and (ii) a drying or semi-drying composition comprising at least one ethylenically unsaturated fatty acid or an ester thereof with a polyhydric alcohol, a compound having at least one vicinal epoxide group, or an epoxyalcohol, said adduct containing carboxylic anhydride moieties; and
b. a resole containing methylol groups, said adduct and said resole being chemically bonded through ester groups resulting from the reaction of said methylol groups with said anhydride moieties.

12. The composition of claim 11 wherein said alpha, beta-ethylenically unsaturated carboxylic anhydride is maleic anhydride.

13. The composition of claim 12 wherein said drying or semi-drying composition is a naturally occurring drying or semi-drying oil.

14. The composition of claim 12 wherein said drying or semi-drying composition is a mixture of ethylenically unsaturated fatty acids derived from a naturally occurring oil.

15. The composition of claim 12 wherein said drying or semi-drying composition is an ester of (a) a mixture of ethylenically unsaturated fatty acids derived from a naturally occurring oil, and (b) a polyhydric alcohol, a compound having at least one vicinal epoxide group, or an epoxyalcohol, said ester being substantially free of alcoholic hydroxyl groups.

16. The composition of claim 15 wherein said ester is an ester of (a) a mixture of ethylenically unsaturated fatty acids derived from a naturally occurring oil, and (b) pentaerythritol, 2-hydroxy-1,1-dimethylethyl 4-hydroxy-3,3-dimethyl-butanoate, or a compound of the formula:

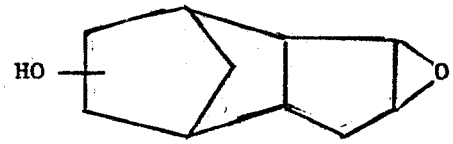

17. The composition of claim 12 wherein said resole comprises the base-catalyzed condensation product of a para-substituted phenol and formaldehyde.

18. The process of claim 12 wherein said adduct is maleinized linseed oil.

* * * * *